Patented July 13, 1926.

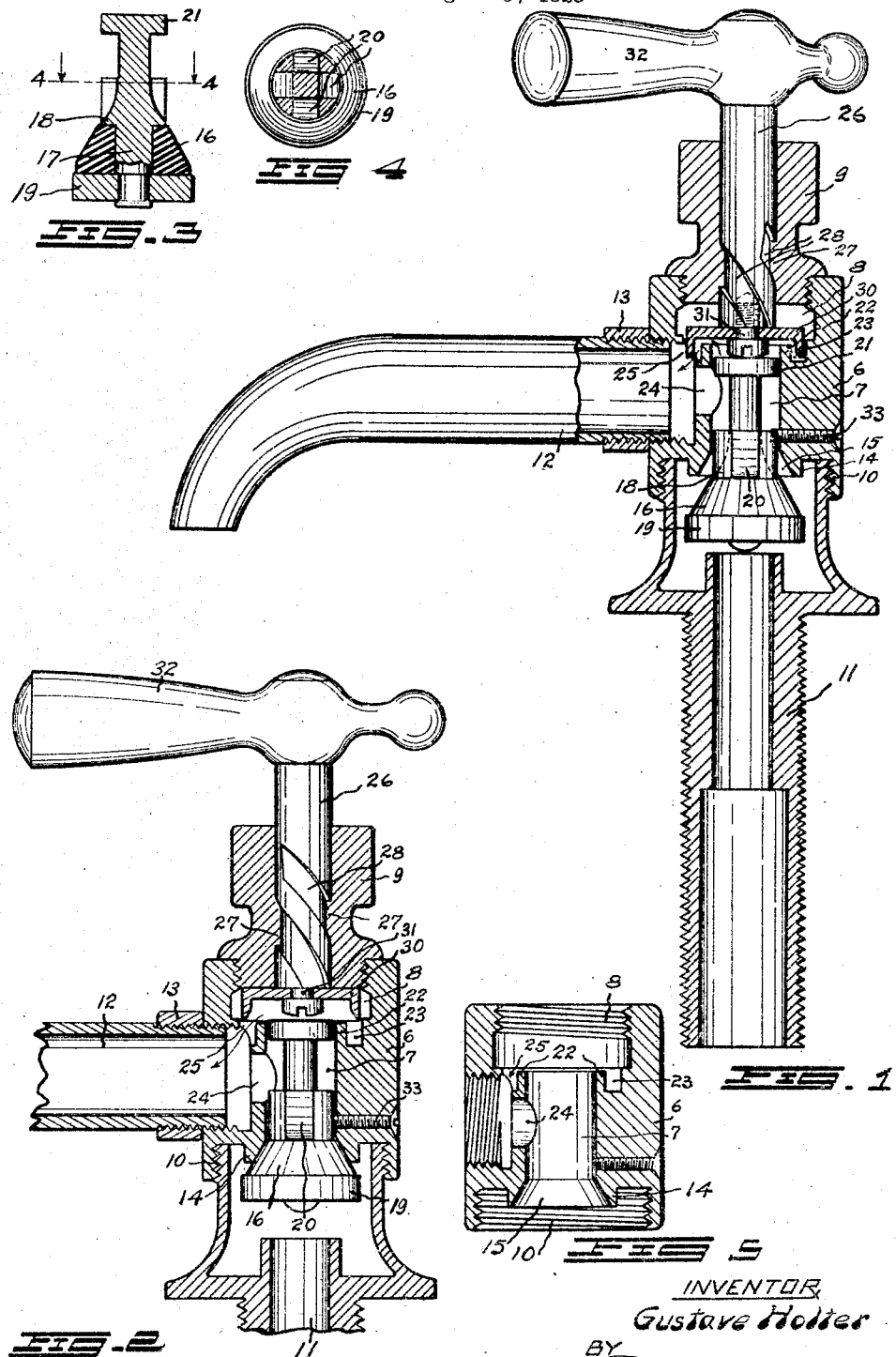

1,592,363

UNITED STATES PATENT OFFICE.

GUSTAVE HOLTER, OF SEATTLE, WASHINGTON.

WATER FAUCET.

Application filed August 8, 1925. Serial No. 48,972.

My invention relates to improvements in water faucets and the object of my invention is to provide a simple and efficient water faucet in which all gaskets and packing around the stem of the faucet are dispensed with and the suction of the water flowing through the faucet is utilized to prevent the escape of water around the faucet stem.

Another object is to provide a faucet of this nature having a deflector of inverted cup shape on the lower end of the faucet operating stem for deflecting the water downwardly and having a communicating passageway between the space below and around said deflector and the main outlet of the faucet.

I accomplish the above and other objects by means illustrated in the accompanying drawings, in which Figure 1 is a view in vertical mid section of a water faucet constructed in accordance with my invention showing the faucet valve in a maximum open position.

Figure 2 is a fragmentary sectional view of the same showing the faucet valve closed.

Figure 3 is a detached view in vertical section of the valve member.

Figure 4 is a sectional view substantially on broken line 4—4 of Fig. 3 and Fig. 5 is a detached sectional view of the body portion of the faucet.

Referring to the drawings, throughout which like reference numerals designate like parts, 6 is a faucet body having a passageway 7 extending lengthwise therethrough and having an internally threaded counterbore 8 at the top end for the reception of a fitting 9 and an internally threaded counterbore 10 at the bottom end for reception of a larger bottom fitting or stem 11 of well known form that may be connected with any suitable water supply pipe.

A faucet spout 12 is threaded into one side of the faucet body 6 and secured thereto by a lock nut 13. The faucet body 6 is provided at the bottom end of passageway 7 with an annular portion 14 that projects downwardly into the larger counterbore 10 at the bottom and that is internally coned or countersunk to form a valve seat 15 for a valve 16 which is preferably of rubber.

The valve 16 is mounted on a stem 17 between an enlarged stem portion 18 at the upper end and a disc 19 at the lower end. The enlarged portion 18 of the stem is provided with a plurality of externally disposed grooves 20 to permit the upward passage of water around said stem, the sections between said grooves fitting relatively closely within the bore 7 and forming guide means. A disc 21 is formed on the upper end of the valve stem 17 and arranged to fit snugly within the passageway 7 to serve as further guide means for said valve stem and to prevent any considerable amount of water from flowing upwardly out of the top of passageway 7. A screw 33 prevents rotation of the valve member.

An annular hub 22 of metal projects upwardly into the upper counter-bore 8 around the passageway 7, leaving an annular recess 23 between said hub and the adjacent wall of the counterbore portion 8.

A passageway 24 is formed between the bore 7 and the spout 12 through which water may flow outwardly through the faucet and another passageway 25 is formed between the passageway 24 and the counter-bored upper end portion 8 of the valve body.

The fitting 9 is axially bored for the reception of a faucet operating stem 26 and said fitting 9 is internally provided with relatively steep threads 27 that engage within threaded recesses 28 in the stem 26. An annular deflector 30, in the form of a relatively shallow inverted cup is secured by screw 31 to the bottom end of the faucet operating stem 26 and is movable vertically in counter-bore portion 8 below the end of fitting 9, the sides of said deflector being arranged to extend downwardly into the recess 23 and over the hub 22. A handle 32 is secured to the upper end of the faucet operating stem 26 for turning the same to open the valve.

In operation the pressure of water entering through pipe 11 and acting on disc 19 will normally hold the faucet valve 16 in the closed position shown in Fig. 2 and will lift the faucet operating stem 26 the maximum amount, the threaded portions 27—28 being of steep enough pitch so that they offer very little resistance to endwise movement of the stem 26. The pressure of the water will always keep the valve 16 tightly closed unless said valve is manually opened thereby preventing leakage from the faucet.

The valve 16 is opened manually by turning the faucet operating stem 26 thus moving said stem downwardly and causing the head of screw 31 to engage with the disc 21 on the valve stem 17 and move said valve stem downwardly, thus permitting water to flow upwardly through the slots 20 in the enlarged valve portion 18 and outwardly through the valve spout 12.

Manifestly it is impossible to form a water tight fit around the disc member 21 on the upper end of valve stem 17 and around the faucet operating stem 26 and still leave said parts so that they will operate freely. It is further impossible to prevent some wear of said parts when the faucet is in use, thus making it impossible to prevent leakage of water around the faucet operating stem 26, unless packing is used around said stem or other means devised to prevent the leakage of water. The use of packing around the faucet operating stem necessarily makes said stem work less freely and requires the renewal of the packing from time to time.

I overcome the necessity of packing the faucet operating stem 26 by the use of the deflector cup 30 and the provision of passageway 25 between faucet outlet spout 12 and the recess 23 below said deflector cup.

When the faucet is open the deflector cup 30 is moved downwardly into recess 23 and over the hub 22 so that any water escaping around the disc 21 will be deflected downwardly by said cup. As the water flows upwardly through grooves 20 and outwardly through spout 21 a suction will be created through passageway 25 which will draw off any excess water in the upper portion of the faucet body thus preventing any leakage around the faucet operating stem 26. It will be seen that this faucet operates on substantially the same principle as an injector in creating the suction through passageway 25 that draws off the excess water from upper portion of faucet body and prevents leakage around the faucet operating stem 26. This suction is produced regardless whether the faucet is open a slight amount or is open to the maximum.

It will be understood that the valve 16 is opened by turning the faucet operating stem 26 and that said valve will be closed automatically by the pressure of water as soon as said faucet operating stem is released thus the faucet will remain open only while the valve is held open.

The foregoing description and accompanying drawings clearly disclose a preferred embodiment of my invention but it will be understood that this disclosure is merely illustrative and that such changes in the invention may be resorted to as are within the scope and spirit of the following claims.

I claim:

1. In a faucet, a faucet body having a longitudinal water inlet passageway and an intercommunicating transverse water outlet passageway, a valve seat formed in said water inlet passageway, a valve arranged to be seated on said valve seat by the pressure of the water, a valve operating stem entering said faucet body in alignment with said water inlet passageway and a deflector cup on the end of said valve operating stem, said body portion having another passageway between said water outlet passageway and the space occupied by said deflector cup whereby a suction will be created around said deflector cup to draw off water from around said deflector cup.

2. In a faucet, a faucet body having a longitudinal water inlet passageway and having a transverse water discharge passageway that intersects said water inlet passageway, a valve seat at the lower end of said water inlet passageway, a valve arranged to be seated on said valve seat by the pressure of water, a valve operating stem entering the upper end of said body and arranged to engage with and open said valve and an inverted deflector cup on the bottom end of said valve operating stem arranged to deflect water downwardly, said body portion having another passageway between said water outlet passageway and the space occupied by said deflector cup whereby a suction will be created around said deflector cup to draw off water from around said deflector cup.

3. In a faucet, a faucet body having a longitudinal water inlet bore extending therethrough and having larger counterbores at both ends, and having a water outlet passageway at one side that intersects said water inlet bore at substantially right angles thereto, said body having an auxiliary suction passageway connecting said upper counterbore with said water outlet passageway, water inlet means connected with the bottom end of said faucet body, a fitting connected with the upper end of said faucet body, a valve seat at the bottom end of said water inlet bore, a valve arranged to be urged against said valve seat by the pressure of water, a stem extending upwardly from said valve, a disc on said stem above the point of intersection of said water outlet opening with said water inlet bore, a valve operating stem loosely mounted for rotation in said fitting at the upper end of said faucet body, means connected with said stem for engaging with said disc and opening said valve and a deflector cup secured in inverted position to the bottom end of said valve stem.

4. In a faucet, a faucet body having a longitudinal water inlet bore extending therethrough and having larger counterbores at both ends, and having a water outlet passageway at one side that intersects said water inlet bore at substantially right angles thereto, said body having an auxiliary suction passageway connecting said upper counterbore with said water outlet passageway, water inlet means connected with the bottom end of said faucet body, a fitting connected with the upper end of said faucet body, a valve seat at the bottom end of said water inlet bore, a valve arranged to be urged against said valve seat by the pressure of water, a stem extending upwardly from said valve, an enlarged guide portion on said stem having peripheral grooves through which water may flow, means for preventing rotation of said valve, a disc on said stem above the point of intersection of said water outlet opening with said water inlet bore, a valve operating stem loosely mountd for rotation in said fitting at the upper end of said faucet body, means connected with said stem for engaging with said disc and opening said valve and a deflector cup secured in inverted position to the bottom end of said valve operating stem.

5. In a faucet, a body portion having a longitudinal bore extending therethrough and having internally threaded counterbores at both ends and having a water outlet passageway at one side intersecting said longitudinal bore and having an opening at one side of said longitudinal bore between said upper counterbore and said water outlet passageway, a water inlet fitting connected with the bottom end of said body portion, a water outlet spout communicating with said water outlet passageway, a fitting threaded into the upper counterbore end of said body, a valve operating stem extending through said fitting, spiral thread means of relatively steep pitch interconnecting said valve operating stem and said fitting, a shallow deflector cup secured in inverted position to the bottom end of said valve operating stem, a conical valve seat at the bottom end of said bore, a conical valve arranged to fit said seat, a stem extending upward from said valve, an enlarged portion on said valve stem above said valve said enlarged portion having peripheral grooves through which water may pass a disc on the upper end of said valve stem, means at the lower end of said valve operating stem for engaging with said disc and opening said valve and a larger disc at the bottom end of said valve.

In witness whereof, I hereunto subscribe my name this 21st day of July A. D. 1925.

GUSTAVE HOLTER.